United States Patent [19]

Pinoow

[11] Patent Number: 4,912,525
[45] Date of Patent: Mar. 27, 1990

[54] APPARATUS FOR TRANSMITTING OPTICAL SIGNALS INTO A PROTECTED ENVIRONMENT

[75] Inventor: Douglas A. Pinoow, Laguna Hills, Calif.

[73] Assignee: Universal Photonix, Inc., Laguna Hills, Calif.

[21] Appl. No.: 300,845

[22] Filed: Jan. 24, 1989

Related U.S. Application Data

[63] Continuation of Ser. No. 908,180, Sep. 17, 1986, abandoned.

[51] Int. Cl.⁴ .............................................. G02F 1/00
[52] U.S. Cl. ...................................... 455/612; 455/618
[58] Field of Search ............... 455/612, 617, 618, 619; 340/825.56; 350/96.18, 96.2, 96.34; 362/32; 65/3.11

[56] References Cited

U.S. PATENT DOCUMENTS

| | | | |
|---|---|---|---|
| 3,641,332 | 2/1972 | Reick et al. | 362/32 |
| 4,198,119 | 4/1980 | Uberbacher | 350/96.2 |
| 4,307,934 | 12/1981 | Palmer | 350/96.2 |
| 4,351,657 | 9/1982 | Kimura et al. | 65/3.11 |
| 4,381,269 | 4/1983 | Kaino et al. | 350/96.34 |
| 4,461,538 | 7/1984 | Breed, III et al. | 350/96.2 |
| 4,485,391 | 11/1984 | Poulain et al. | 350/96.2 |
| 4,573,046 | 2/1986 | Pinnow | 340/825.56 |
| 4,655,545 | 4/1987 | Yamanishi et al. | 350/96.34 |

FOREIGN PATENT DOCUMENTS 2820184  11/1979  Fed. Rep. of Germany ... 350/96.18

OTHER PUBLICATIONS

Brackett—Photodetector Package—Western Electric Tech. Digest, No. 64—Oct. 1981—p. 3 455/619.
Weik; *Fiber Optics and Lightwave Communications Standard Dictionary;* Van Nostrand Reinhold Co.; New York; 1981; p. 142.

*Primary Examiner*—Robert L. Griffin
*Assistant Examiner*—T. Salindong
*Attorney, Agent, or Firm*—Bacon & Thomas

[57] ABSTRACT

Apparatus for transmitting optical signals from an unprotected environment to a protected environment are disclosed. The apparatus may take the form of a lightpipe which has a light transmitting core and a cladding material surrounding the core having an index of refraction lower than the core. The lightpipe is aligned with a photodetector by means of a retaining collar. An omnidirectional optical signal collector is also disclosed for receiving optical signals from any direction and relaying them to a secure photodetector.

11 Claims, 1 Drawing Sheet

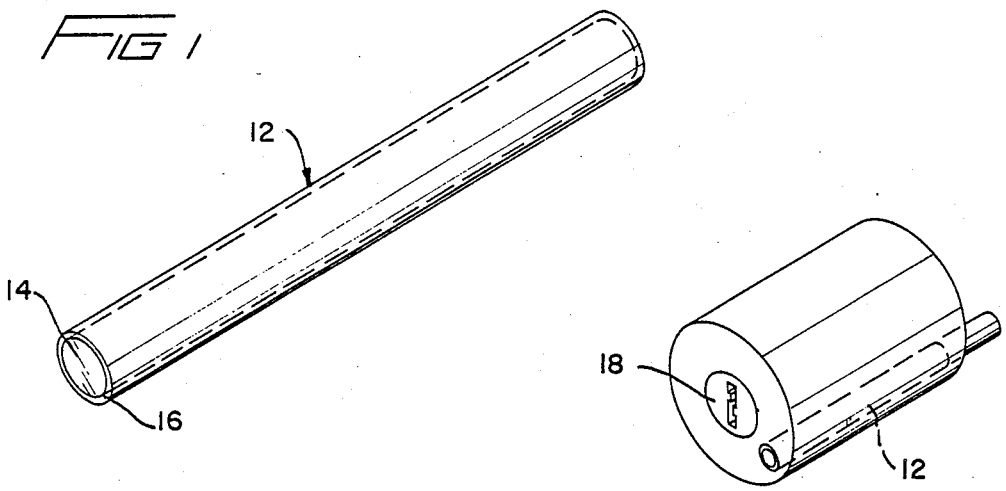
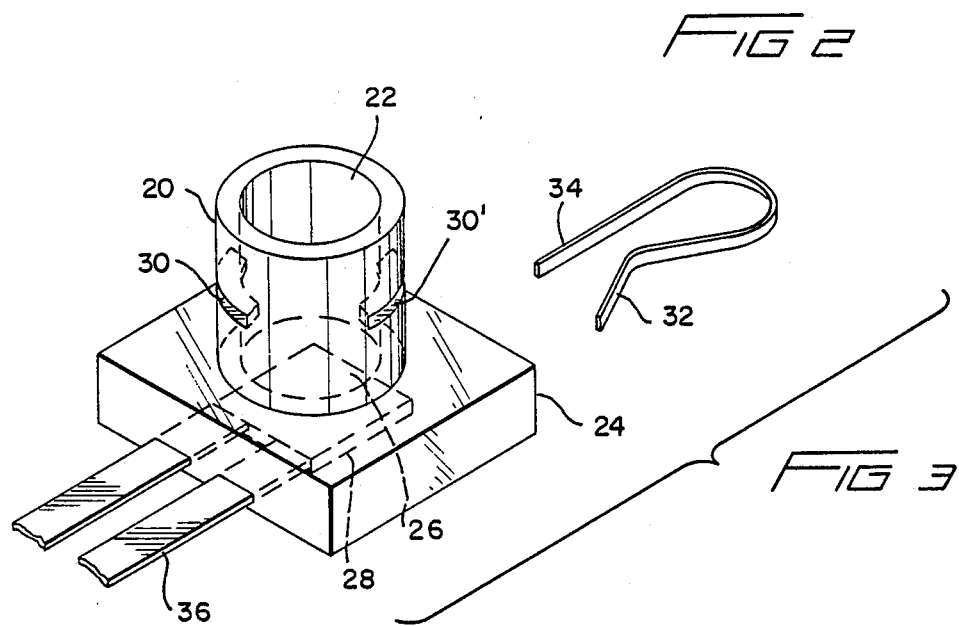
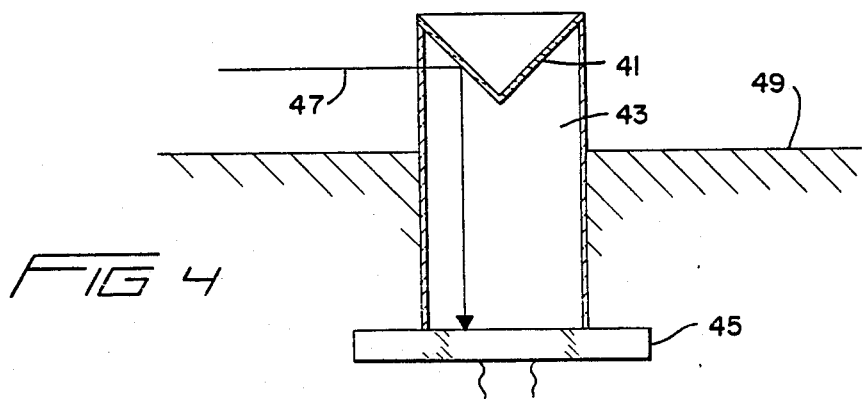

APPARATUS FOR TRANSMITTING OPTICAL SIGNALS INTO A PROTECTED ENVIRONMENT

This application is a continuation, of application Ser. No. 908,180, filed Sept. 17, 1986 now abandoned.

BACKGROUND OF THE INVENTION

1. Technical Field of the Invention

This invention is directed to apparatus for relaying an optical beam from an unprotected environment into a protected environment for all types of optical remote control devices, including security devices and systems.

2. Description of the Prior Art

In my prior U.S. Pat. No. 4,573,046, the entire disclosure of which is hereby incorporated by reference, there is disclosed an apparatus and method for a universal electronic locking system. The system relies upon a signal transmitting unit contained within a watch which is capable of storing a plurality of codes in its memory and transmitting any one of the stored codes as an encoded optical signal to a signal receiving unit. The signal receiving unit contains a photodetector for receiving the optical signal and transforming it into an electrical signal which can be interpreted by a processor to determine whether it corresponds to a valid code stored in the memory of the signal receiving unit. If so, the signal receiving unit issues an activation signal which unlatches a lock.

As further described in the patent, the optical signal is received at the signal receiving unit by a photodetector which is recessed in a hollow area behind a transparent window. The hollow area is preferably a tubular cavity which is covered with an optically absorbing material which absorbs ambient light which enters through the window.

SUMMARY OF THE INVENTION

The present invention is directed to apparatus for relaying an optical beam from an unprotected environment into a protected environment. The apparatus may take the form of a lightpipe, as more fully described hereinafter, or an omnidirectional optical signal collector, as more fully described hereinafter. While the lightpipe is particularly adapted to replace the tubular cavity disclosed in U.S. Pat. No. 4,573,046 for transmitting the optical signal from the outside of the signal receiving unit to the photodetector, its use is not so limited.

In addition to being useful for a variety of optically activated locks, including car door locks, garage locks, home and business locks, etc., the lightpipe can be used in conjunction with keypad readers, magnetic card readers and virtually any device which requires that an optical beam be relayed from an unprotected environment to a protected environment housing the photodetector.

The lightpipe of the invention may be described as a relatively large semi-rigid optical fiber having a light transmitting core which is approximately equal in diameter (i.e., ±25%) to the linear dimension of the active area of the photodector to which it connects. Typically, this dimension is approximately ⅛ inch for many of the photodectors used in consumer products such as remote controlled TVs and VCRs. The light transmitting core is surrounded by a cladding material having an index of refraction lower than the core, as required to confine the light being transmitted to the core.

One end of the lightpipe is exposed to the unprotected environment where it can receive transmissions of optical signals from optical signalling devices, such as that described in U.S. Pat. No. 4,573,046, or any other infrared remote control unit. The other end of the lightpipe is positioned adjacent to a photodetector such that the active area of the photodetector receives optical signals transmitted therethrough. A filter which passes infrared light but blocks sun and room light may be placed between the end of the lightpipe and the photodectector to enhance the signal being transmitted.

In a preferred embodiment of the invention, the lightpipe is maintained in proper alignment with the photodetector by a retaining collar in the form of a cylindrical sleeve having an inside diameter slightly greater than the outside diameter of the lightpipe. The collar receives the end of the lightpipe and holds it in a fixed position in relation to the photodetector.

The photodetector is preferably encased within a plastic shell which protects the detector and functions as a band pass filter for infrared light.

Electrical contacts connected to the photodetector protrude from the shell and are connected to a processor or other device which interprets the signal received by the photodetector and takes the appropriate action whether it be unlocking a door, setting off an alarm, etc.

The omnidirectional optical signal collector is designed to provide 360° illumination of a single planar photodiode. This device is particularly useful in controlling a moving remote control object such as a toy or for activating or deactivating a security system in, for example an automobile from any direction of approach.

The omnidirectional optical signal collector comprises a conical shaped reflective surface disposed within a transparent, light conducting material such as the type of material used to make the lightpipe. The reflective surface directs the optical signal into the light conducting material and to a planar photodiode located at the other end of the light conducting material in the protected environment.

Further details of the invention will be evident upon review of the detailed description which follows.

BRIEF DESCRIPTION OF THE FIGURES

FIG. 1 is a perspective view of the lightpipe in accordance with the invention.

FIG. 2 depicts the lightpipe of the invention disposed within a lock mechanism.

FIG. 3 is a perspective view showing the retaining collar for retaining the lightpipe in proper alignment with a photodetector.

FIG. 4 is an elevational, cross sectional view of the omnidirectional optical signal collector of the invention.

DETAILED DESCRIPTION OF THE PREFERRED EMBODIMENTS

Referring to FIG. 1, a lightpipe in accordance with the invention is shown. The lightpipe 12 is rigid due to its relative thickness and cylindrical in shape. It comprises a light conducting core 14 which may be made from composite glass or pure silica or from a synthetic resin such as polymethylmethacrylate. The core is surrounded by cladding 16 which is made from a material having a lower index of refraction than the core. Suitable materials for the cladding include low index polymer materials such as polytetrafluoroethylene (Teflon) and perfluorinated alkoxy polymers. A particularly convenient way to apply the cladding to the core is to insert a core rod into a loose fitting tube of cladding material. By selecting tubing which is heat shrinkable, it is possible to make a tight fit between the core and cladding by applying heat.

The diameter of the core of the lightpipe is selected to match the active area of the photodiode. Thus, diameters on the order of ⅛ inch are typical, although this dimension may be increased or decreased depending upon particular applications.

In FIG. 2, lightpipe 12 is shown in combination with a standard key operated lock 18. This permits the lock to be operated by a key or by a remote optical signalling device such as disclosed in U.S. Pat. No. 4,573,046. In this case, the encoded optical signal is transmitted from the signal transmitting unit to the vicinity of the lock. A portion of the signal enters lightpipe 12 where it is transmitted to a photodetector (not shown). The photodetector transforms the optical signal to an electrical signal which can be interpreted by a processor for producing the desired function, e.g., lock or unlock.

FIG. 3 shows the retaining collar for positioning one end of the lightpipe in proper alignment with the photodetector. Retaining collar 20 is in the form of a cylindrical sleeve having a circular opening 22 therethrough for the end of the lightpipe. The sleeve is adhered to photodetector housing 24 by glue or other adhesive such that the bottom 26 of opening 22 is directly over photodetector 28. Thus, when a lightpipe is inserted into the retaining collar, its end passes into opening 22 and its stopped once it is flush against photodetector housing 24 at the bottom of the retaining collar.

Slots 30 are provided in the retaining collar for insertion of further retaining means for the lightpipe such as a metal U-shaped clip in which the distance between the two ends 32 and 34 is less than the outer diameter of the lightpipe. Thus, after the lightpipe is inserted into the retaining collar, ends 32 and 34 of the metal clip are inserted into slots 30 and 30', thereby clamping the lightpipe securely in position within the retaining collar.

Photodetector housing 24 is preferably made from a colored plastic material which serves as a filter, allowing light in the emission band of the signal transmitting unit, e.g., infrared light, to pass through to the photodetector 28 but filtering out sun and/or room light which may be transmitted from the unprotected environment through the lightpipe. Photodetector 28 may be any of a number of standard photodetectors which are well known in the art.

Electrical contacts 36 from photodetector 28 protrude through the photodetector housing 24 and are readily connected to electrical wiring to transmit the electrical signal generated by the photodetector upon receipt of the optical signal, to the appropriate processing circuitry (not shown). Typically, the electrical signal will be directed to a processor which compares the encoded signal received to one or more codes stored in its memory and issues instructions accordingly. For example, if a lock or security system is involved, as described in U.S. Pat. No. 4,573,046, the processor would compare the encoded signal received from the signal transmitting unit to those stored in its memory and activate an unlatching mechanism if the encoded signal matches a code stored in memory.

Referring to FIG. 4, the omnidirectional optical signal collector is shown. The device comprises a conical shaped reflecting surface 41 disposed atop a solid, cylindrical shaped transparent light conducting material 43 which supports the reflecting surface and provides a path for transmitting optical signals which are reflected from the reflective surface to planar photodetector 45, as shown by light beam 47. The photodetector 45 is maintained within protected environment 49. The omnidirectional optical signal collector, thus, provides a highly versatile means of receiving an optical signal from an unprotected environment and relaying it to a photodetector in a protected environment where it can be further processed.

While the invention has been described in terms of certain preferred embodiments, one skilled in the art will readily appreciate that various modifications, changes, omissions and substitutions may be made without departing from the spirit thereof. It is intended, therefore, that the present invention be limited solely by the scope of the following claims.

I claim:

1. A device for transmitting an optical signal from a source of optical signals in an unprotected environment to a protected environment comprising:
   a source of optical signals disposed in an unprotected environment;
   a rigid lightpipe having a light transmitting core region and a cladding material surrounding said core region, said cladding material having an index of refraction which is lower than the index of refraction of said core region, said lightpipe being detached and spaced from the source of optical signals associated therewith and being devoid of light focusing lenses;
   a photodetector for receiving light transmitted through said lightpipe; and
   retaining means for said lightpipe to maintain it in proper alignment with said photodetector.

2. The device of claim 1, wherein said retaining means is a retaining collar into which one end of the lightpipe is inserted, said retaining collar being fixedly positioned with respect to said photodetector such that when the lightpipe is placed in said retaining collar the core region of the lightpipe is aligned with the active area of the photodetector.

3. The device of claim 2, wherein said retaining collar contains means for securing said lightpipe therein.

4. The device of claim 1, wherein said photodetector is contained within a housing.

5. The device of claim 4, wherein said housing serves as a band pass filter.

6. The device of claim 4, wherein said retaining means is adhered to said housing.

7. The device of claim 1, wherein the core region is formed from polymethylmethacrylate and said cladding is formed from a perfluorinated alkoxy resin.

8. The device of claim 1, wherein the cladding region is formed from a polytetrafluorinated ethylene resin.

9. A lock incorporating the device of claim 1.

10. The device of claim 1, wherein the diameter of the light transmitting core is within ±25% of the linear dimension of the photodetector.

11. The device of claim 1, wherein the cladding material is made from heat shrinkable tubing.

* * * * *

UNITED STATES PATENT AND TRADEMARK OFFICE
CERTIFICATE OF CORRECTION

PATENT NO. : 4,912,525

DATED : March 27, 1990

INVENTOR(S) : Douglas A. PINNOW

It is certified that error appears in the above-identified patent and that said Letters Patent is hereby corrected as shown below:

On the title page:

In the second line of the patent, the last name of the inventor should be changed from "Pinoow" to --Pinnow--.

Item [75], the last name of the inventor should be changed from "Pinoow" to --Pinnow--.

Signed and Sealed this

Twenty-third Day of April, 1991

Attest:

HARRY F. MANBECK, JR.

Attesting Officer

Commissioner of Patents and Trademarks